(12) United States Patent
SanktJohanser

(10) Patent No.: US 6,761,549 B2
(45) Date of Patent: Jul. 13, 2004

(54) TOOL FOR FOAMING COMPONENTS TO A PANE FOR A MOTOR VEHICLE

(75) Inventor: Manfred SanktJohanser, Diessen (DE)

(73) Assignee: Webasto Vehicle Systems International GmbH, Stockdorf (DE)

(*) Notice: Subject to any disclaimer, the term of this patent is extended or adjusted under 35 U.S.C. 154(b) by 111 days.

(21) Appl. No.: 10/078,532

(22) Filed: Feb. 21, 2002

(65) Prior Publication Data
US 2002/0146279 A1 Oct. 10, 2002

(30) Foreign Application Priority Data
Feb. 23, 2001 (DE) .......................................... 101 09 011

(51) Int. Cl.[7] .............................................. B29C 44/18
(52) U.S. Cl. ........................ 425/4 R; 264/252; 425/125; 425/DIG. 47
(58) Field of Search .................. 425/125, DIG. 47, 425/4 R, 812 R, 252

(56) References Cited

U.S. PATENT DOCUMENTS 5,723,152 A * 3/1998 Hirata et al. ................ 425/4 R
6,491,508 B1 * 12/2002 Kurosawa et al. ..... 425/DIG. 47
6,530,764 B2 * 3/2003 Mishima et al. ............ 425/125

FOREIGN PATENT DOCUMENTS

DE    198 44 204 A    4/2000

* cited by examiner

*Primary Examiner*—Tim Heitbrink
(74) *Attorney, Agent, or Firm*—Nixon, Peabody LLP; David S. Safran

(57) ABSTRACT

A tool for foaming of a component to a pane for a motor vehicle, which forms at least one part of a boundary of an area to be peripherally foamed and includes a rigid insert for holding the component. The insert includes a bottom having an opening for insertion of an end of the component facing away from the peripheral foaming area. An elastic sealing ring surrounds the opening and lies on the bottom. A pressure element is used to press the sealing ring against the bottom to deform the sealing ring in the lateral direction to make tight lateral contact with a part of the component which has been inserted through the opening.

15 Claims, 3 Drawing Sheets

TOOL FOR FOAMING COMPONENTS TO A PANE FOR A MOTOR VEHICLE

BACKGROUND OF THE INVENTION

1. Field of the Invention

This invention relates to a tool for foaming components to a pane for a motor vehicle, especially a vehicle roof pane.

2. Description of Related Art

In tools for foaming-on of components, the problem arises that the components, on the one hand, must be held in the foaming process and, on the other hand, in the holding area, no foam should emerge from the area to be peripherally foamed. In generic foaming tools, it is well known for this purpose to provide the foaming tool with built-in rubber sealing rings, inflatable sealing elements, or milled-out recesses in the tool into which pockets of polyurethane are inserted, wherein the components are inserted into these elements.

It is a disadvantage in this process that when the components are inserted, serious friction can occur by which, on the one hand, a large amount of force must be applied and, on the other hand, distortion or bending of the component can occur upon insertion. Upon removal from the mold after the foaming process, deformations remaining in the foamed-on material can occur which leads to an adverse optical impression. On the other hand, the sealing action is often not sufficient or the insertion of the components can be unreliable due to remaining foam residues in the sealing elements. Replacement of worn sealing elements is complex and the service life of the sealing elements is relatively short. For inflatable sealing elements, investment costs are higher and a large installation space is required.

SUMMARY OF THE INVENTION

It is therefore one object of the present invention to overcome the deficiencies of the prior art and to provide a foaming tool which enables simple and low-wear insertion of the components to be foamed on.

It is another object of the present invention to provide a foaming tool which enables good sealing action and stress-free peripheral foaming.

Yet another object of the present invention is to provide a foaming tool which keeps tool costs low.

The above object and other objects are achieved in accordance with the present invention by providing a tool for foaming a component to a pane for a motor vehicle, wherein the tool forms at least one part of a boundary of an area to be peripherally foamed and comprises a rigid insert for holding the component. The rigid insert includes a bottom having an opening for insertion of an end of the component facing away from the peripheral foaming area. The tool also includes an elastic sealing ring surrounding the opening and positioned on the bottom of the rigid insert. A pressure element is provided to press the sealing ring against the bottom of the insert to deform the sealing ring in a lateral direction sufficiently to cause the sealing ring to make tight lateral contact with a part of the component which has been inserted through the opening.

The present invention is advantageous in that the components can be inserted quickly, with low friction, and free of distortion, while achieving very good sealing action with respect to the foaming material. Also, a long service life of the tool components is attained. Moreover, the dimensions when foaming-in can be reliably maintained in the process, and the tool costs are kept low. Tools can be used, without additional modifications, which are provided with a milled-out area for conventional polyurethane pockets. Furthermore, the amount of installation space required is much less than for inflatable polyurethane pockets.

DETAILED DESCRIPTION OF THE INVENTION

Figure 1:
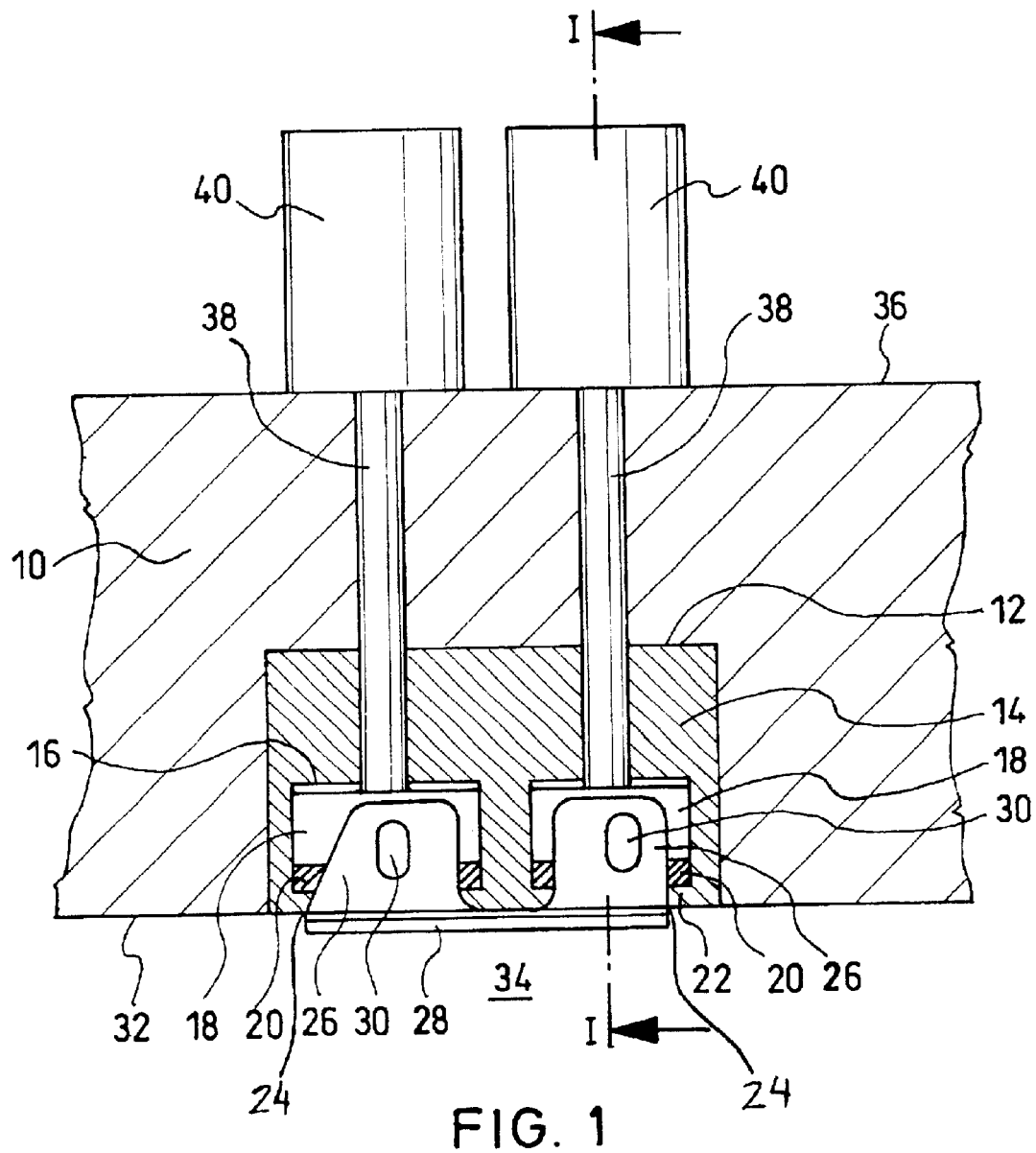
FIG. 1 shows a schematic view of part of the mold tool of the present invention, partially in a sectional view.
Figure 2:
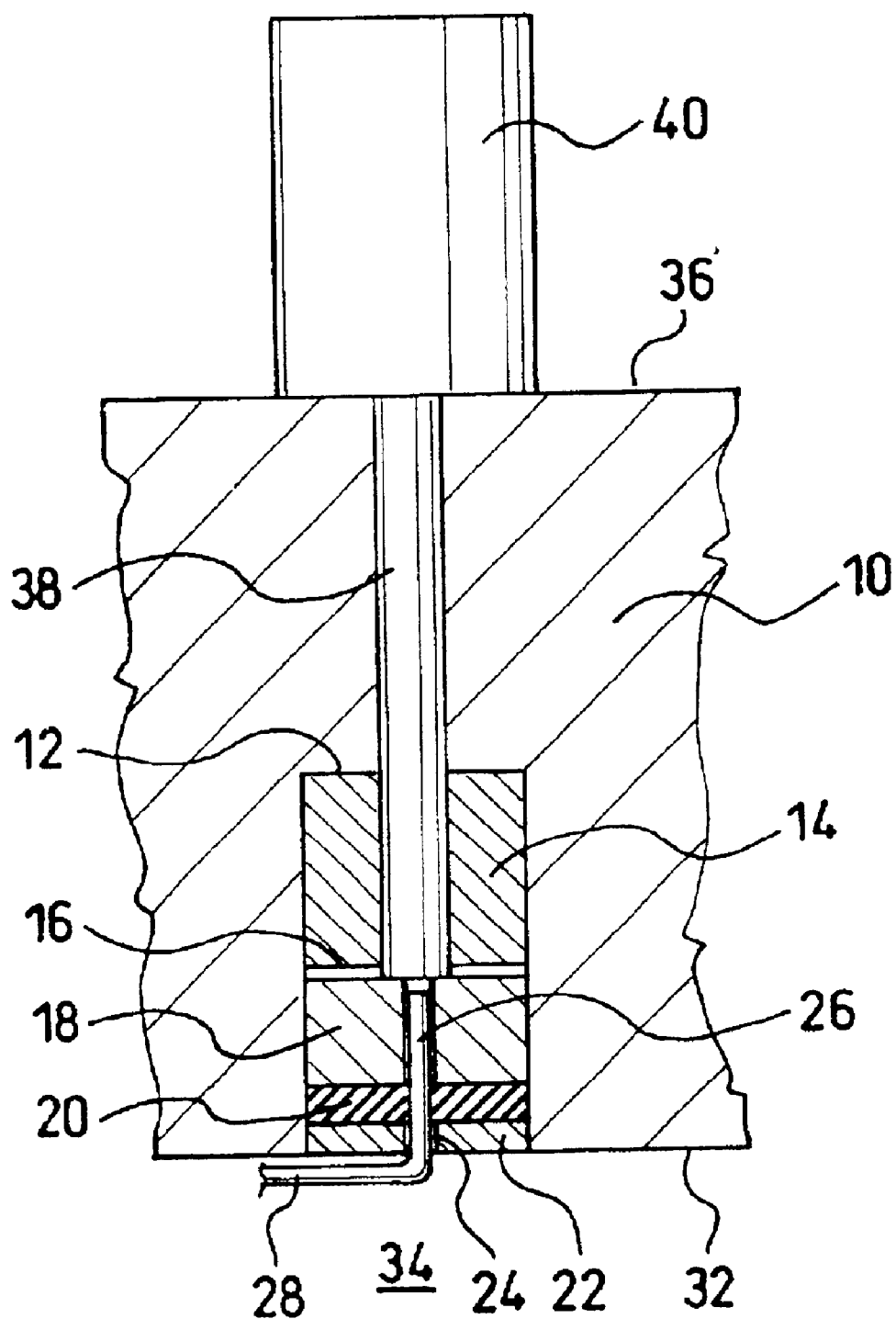
FIG. 2 shows a sectional view along line I—I in FIG. 1.

As shown in FIGS. 1 and 2, the foaming tool 10 of the present invention is provided with a milled-out recess 12 into which a preferably steel insert 14 is fitted and attached, for example, by means of screws. The recess 12 can be one as is provided for the polyurethane pockets used conventionally in foaming tools. In this way, the existing tools can be easily modified accordingly.

The insert 14 has two recesses 16. A respective pressure element 18 and a sealing ring 20 are positioned in each recess 16. On its lower end, the insert 14 has a bottom 22 provided with one opening 24 (FIG. 2) each in the area of the recesses 16. The bottom 22 is made for insertion of the projecting end 26 of a retaining angle 28. The sealing rings 20 are made preferably of soft rubber and each surround the insertion opening 24 of the bottom 22. The dimension of the central opening of the sealing rings 20 is chosen such that the end 26 of the retaining angle 28 to be inserted, when the pressure element 18 does not rest on the sealing ring 20, can be inserted through the sealing ring 20 essentially without friction and without distortion.

Figure 3:
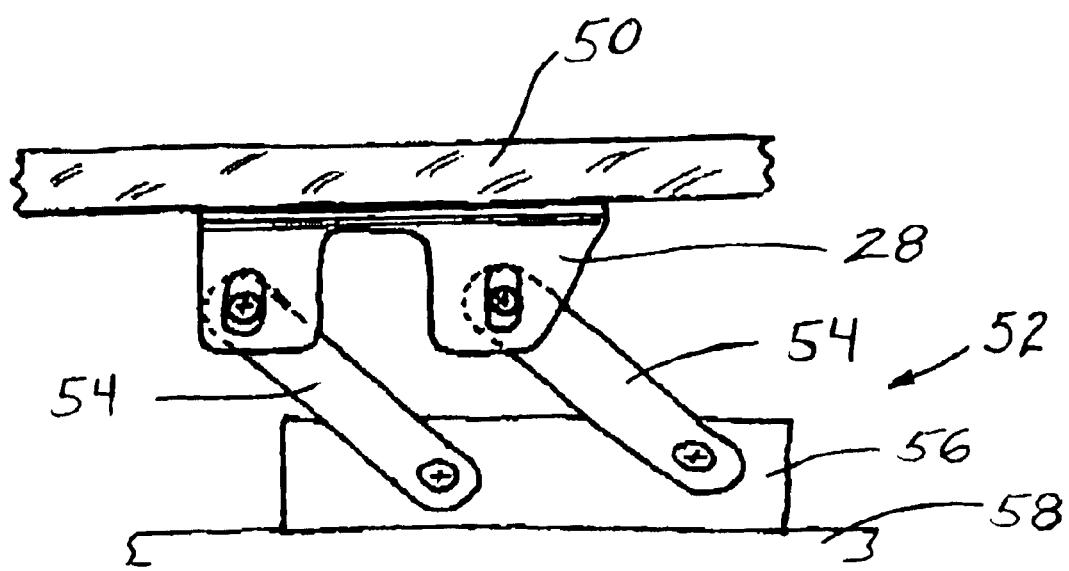
FIG. 3 shows a side view of a retaining angle connected to a pane and an adjustment mechanism of a motor vehicle.

As shown in FIG. 3, the retaining angle 28 is intended for foaming to a glass or plastic pane 50 for an openable motor vehicle roof. In the foamed-on state, the retaining angle 28 is used, for example, as a mounting element for the roof pane 50 on the corresponding adjustment mechanism 52 including, for example, levers 54 and slider 56 mounted on a guide rail 58. For this purpose, openings 30 (FIG. 1) in the retaining angle are provided. The retaining angle 28 may also be used as a holder for guide shoes to guide the pane in roof-mounted guide rails.

The illustrated tool 10 forms the top tool of a foaming tool arrangement which furthermore comprises a corresponding bottom tool (not shown). The top tool 10 is adjustable with respect to the bottom tool in the vertical direction to enable insertion of the pane into the tool arrangement. The top tool 10 and the bottom tool interact in order to delineate or fix the area of the pane to be peripherally foamed. Ordinarily, the pane is foamed only in the edge area. Preferably polyurethane is used as the foam material. The area to be peripherally foamed, generally indicated at 34 in FIGS. 1 and 2, begins underneath the lower edge 32 of the top tool 10 or underneath the bottom 22 of the insert 14. The top edge of the top tool 10 is labeled with reference number 36.

The two pressure elements 18 are made as steel rings and can be adjusted in the vertical direction by means of a rod 38 which is driven by a driving cylinder 40. Before inserting the end 26 of the retaining angle 28, that is, the end remote from the area to be peripherally foamed, the pressure elements 18 are raised by means of cylinders 40 so that no force is exerted in the vertical direction on the sealing rings 20. The cylinders 40 can be compressed air cylinders. After inserting the ends 26 of the retaining angle 28 through the opening 24 or through the central area of the sealing rings 20, the cylinders 40 press each pressure element 18 down via the rods 38. Thus, the two sealing rings 20 are pressed against the bottom 22 and expand in the horizontal direction as a result of the compression which takes place in the vertical direction. Due to this horizontal expansion, the sealing rings 20 make secure contact with the inserted ends 26 of the retaining angle 28, by which the retaining angle 28 is fixed with respect to the top tool 10. Also, in the area of the sealing rings 20, sealing against the inserted end 26 with respect to the peripherally foamed area 34 is attained. In addition, the foaming material is prevented from leaving the peripherally foamed area 34 by this sealing action.

Instead of being positioned on the top tool, the described insert 14 may be positioned on the bottom tool. In this case, the "bottom" of the insert is then at the top. The term "bottom" is generally to be understood as the area of the insert 14 which delimits the insert 14 from the peripheral foaming area 34.

The important aspect of this invention is that there is an elastic sealing ring which exhibits expansion and has an elastic recovery force in the lateral direction which can be changed by means of a pressure element which can be actuated. This invention enables simple, low-friction and distortion-free insertion of the end of the component intended to be foamed on, i.e. the end facing away from the peripheral foaming area while providing good sealing action.

I claim:

1. A tool for foaming a component to a pane for a motor vehicle, the tool forming at least one part of a boundary of an area to be peripherally foamed, comprising:

a rigid insert for holding the component, the rigid insert including a bottom having an opening for insertion of an end of the component, the end of the component facing away from the peripheral foaming area;

an elastic sealing ring surrounding the opening and positioned on the bottom of the rigid insert;

a pressure element adapted to press the sealing ring against the bottom of the insert to deform the sealing ring in a lateral direction sufficiently to cause the sealing ring to make tight lateral contact with a part of the component which has been inserted through the opening.

2. The tool of claim 1, wherein the insert is made of metal.

3. The tool of claim 2, wherein the insert is formed of steel.

4. The tool of claim 1, wherein the sealing ring is formed of soft rubber.

5. The tool of claim 1, wherein the sealing ring permits the component to be inserted into the opening without distortion of the sealing ring.

6. The tool of claim 1, wherein the pressure element is annular.

7. The tool of claim 6, wherein the pressure element is formed as a steel ring.

8. The tool of claim 1, further including a drive cylinder adapted to actuate the pressure element.

9. The tool of claim 8, wherein said drive cylinder is a compressed air cylinder.

10. The tool of claim 1, wherein the tool further includes a recess, said insert being inserted into said recess.

11. The tool of claim 10, wherein the recess is milled out.

12. The tool of claim 1, wherein the bottom of the insert includes at least two insertion openings and a respective sealing ring and pressure element associated with each opening.

13. The tool of claim 1, wherein the pane is one of a transparent glass pane and a plastic pane for an openable motor vehicle roof.

14. The tool of claim 13, wherein the component is a retaining angle for attaching the pane to an adjustment mechanism.

15. The tool of claim 1, wherein the tool is an upper tool of a peripheral foaming arrangement.

\* \* \* \* \*